US007899142B2

(12) United States Patent
Hayashi et al.

(10) Patent No.: US 7,899,142 B2
(45) Date of Patent: Mar. 1, 2011

(54) LEAKAGE SIGNAL CANCELLATION APPARATUS

(75) Inventors: Ryoji Hayashi, Tokyo (JP); Naohisa Takayama, Tokyo (JP); Mitsuhiro Shimozawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 547 days.

(21) Appl. No.: 12/065,808

(22) PCT Filed: Jul. 28, 2006

(86) PCT No.: PCT/JP2006/315036
§ 371 (c)(1),
(2), (4) Date: Mar. 5, 2008

(87) PCT Pub. No.: WO2007/029429
PCT Pub. Date: Mar. 15, 2007

(65) Prior Publication Data
US 2009/0232260 A1 Sep. 17, 2009

(30) Foreign Application Priority Data
Sep. 6, 2005 (JP) .............................. 2005-257879

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl. ........................ 375/346; 375/350; 375/229; 375/284; 375/285; 455/296; 455/307; 455/63.1; 455/570; 370/276; 370/289

(58) Field of Classification Search ................. 375/346, 375/350, 229, 284, 285; 455/296, 307, 63.1, 455/570, 114.2; 370/286, 289
See application file for complete search history.

(56) References Cited

U.S. PATENT DOCUMENTS 5,444,864 A * 8/1995 Smith .......................... 455/84

(Continued)

FOREIGN PATENT DOCUMENTS

JP 10 62518 3/1998

(Continued)

OTHER PUBLICATIONS

Beasley et al: "Solving the Problems of a Single Antenna Frequency Modulated CW Radar" IEEE International Radar Conference, p. 391-395, 1990.

*Primary Examiner*—Phuong Phu
(74) *Attorney, Agent, or Firm*—Oblon, Spivak, McClelland, Maier & Neustadt, L.L.P.

(57) ABSTRACT

A quadrature modulator divides a part of a transmitted signal to generate a cancel signal. A signal comparator compares the amplitude and phase of the cancel signal which is generated by the quadrature modulator with those of a received signal, and outputs signals corresponding to the comparison results to the quadrature modulator. The quadrature modulator generates the cancel signal on the basis of the output signals of the signal comparator, and these components perform feedback control such that the cancel signal has the same amplitude as the leakage signal and is in phase with the leakage signal. A combiner combines the cancel signal with an antiphase cancel signal, which is made to be in opposite phase with the cancel signal outputted from the quadrature modulator, to cancel out the leakage signal.

13 Claims, 8 Drawing Sheets

U.S. PATENT DOCUMENTS

| | | | |
|---|---|---|---|
| 7,471,204 B2 * | 12/2008 | Safarian et al. | 340/572.1 |
| 7,711,329 B2 * | 5/2010 | Aparin et al. | 455/83 |
| 2002/0072344 A1 * | 6/2002 | Souissi | 455/296 |

FOREIGN PATENT DOCUMENTS

| | | |
|---|---|---|
| JP | 2003 273770 | 9/2003 |

* cited by examiner

LEAKAGE SIGNAL CANCELLATION APPARATUS

FIELD OF THE INVENTION

The present invention relates to a leakage signal cancellation apparatus for use in an interrogator of a RFID (radio frequency identification) system, or a radar apparatus.

BACKGROUND OF THE INVENTION

Conventionally, there has been provided, for example, a leakage signal cancellation circuit for use in an interrogator of a RFID system, or the like, which divides a part of a transmitted signal by using a coupler, which adjusts the amplitude and phase of the divided signal by using a variable attenuator and a phase shifter in such a manner that the signal has the same amplitude as a leakage signal which leaks from a transmitter to a receiver and is in opposite phase with the leakage signal, and which combines a generated cancel signal with a received signal so as to cancel out the leakage signal (for example, refer to patent reference 1).

There has been also proposed a method of adjusting the amplitude and phase of a signal divided by using a quadrature modulator so as to generate a cancel signal which has the same amplitude as a leakage signal and is in opposite phase with the leakage signal, and combining the cancel signal with a received signal so as to cancel out the leakage signal (for example, refer to nonpatent reference 1).

This reference further shows a circuit which constructs a feedback loop in such a manner as to follow variations in the leakage signal, and which can cancel out the leakage signal with stability (refer to FIG. 2).

This circuit performs the following operation. That is, the circuit converts the received signal into baseband I and Q signals using a quadrature mixer after generating the cancel signal so as to cancel out the leakage signal. A signal which is a part divided from a transmitted signal is inputted to the LO input of this quadrature mixer. The gains of baseband I and Q signals which are outputted by the quadrature mixer are adjusted and are led to the I and Q inputs of the above-mentioned quadrature modulator. Then, the leakage signal which was not able to be canceled out through the combination with the cancel signal is decomposed into I and Q signals by the quadrature mixer using the signal which is the divided part of the transmitted signal. The I and Q signals of the leakage signal which was not able to be canceled out are added to the I and Q signals of the quadrature modulator which generates the cancel signal from the same signal which is the divided part of the transmitted signal, so that the leakage signal is further canceled out. Even when the amplitude and phase of the leakage signal vary and therefore the leakage signal cannot be sufficiently canceled out, the conventional circuit operates in the same way to follow the variations in the leakage signal, so that the leakage signal is further canceled out.

[Patent reference 1] JP,10-62518,A

[Nonpatent reference 1] "Solving the problems of a single antenna frequency modulated CW radar", written by Beasley et al., Record of the IEEE 1990 International Radar Conference, 7-10 May 1990, pp 391 to 395, FIGS. 1 and 2

The amplitude and phase of the leakage signal which leaks from the transmitter to the receiver vary according to the surrounding environments of the antenna, i.e., whether an object, such as a reflector (metal) or a human body, exists in the vicinity of the antenna. A problem with the conventional leakage signal cancellation circuit shown in patent reference 1 is that because its mechanism for adjusting the signal divided from the transmitter in such a manner that the signal has the same amplitude as the leakage signal and is in opposite phase with the leakage signal is semifixed, the conventional leakage signal cancellation circuit cannot follow variations in the amplitude and phase of the leakage signal which are caused by change in the surrounding environments of the antenna and therefore cannot perform stable cancellation of the leakage signal.

The conventional leakage signal cancellation circuit shown in nonpatent reference 1 can follow variations in the leakage signal with feedback control. However, such a circuit needs to make the leakage signal certainly pass through a quadrature mixer in order to acquire a cancel signal. A problem with the structure shown in nonpatent reference 1 is therefore that because the feedback control works and a large leakage signal is inputted to the quadrature mixer during operation until the leakage signal is sufficiently canceled out, an expensive quadrature mixer which can withstand an input with large signal power must be used as the mixer.

The present invention is made in order to solve the above-mentioned problems, and it is therefore an object of the present invention to provide a leakage signal cancellation apparatus which can acquire a cancel signal certainly and which can implement cancellation of a leakage signal with stability while following variations in the leakage signal.

DISCLOSURE OF THE INVENTION

A leakage signal cancellation apparatus in accordance with the present invention comprises: a quadrature modulator or a vector modulator for dividing a part of a transmitted signal so as to generate a cancel signal; a signal comparing means for comparing the amplitude and phase of the cancel signal generated by the quadrature modulator or the vector modulator with those of a received signal, and for outputting signals corresponding to results of the comparison; and a combiner for combining the received signal with an antiphase cancel signal whose phase is made to be opposite to that of the cancel signal outputted from the quadrature modulator or the vector modulator so as to cancel out the leakage signal, and the quadrature modulator or the vector modulator generates the cancel signal on the basis of the output signals outputted by the signal comparing means, and these components perform feedback control in such a manner that the cancel signal has the same amplitude as the leakage signal and is in phase with the leakage signal.

Therefore, the leakage signal cancellation apparatus can acquire the cancel signal certainly, and can implement the cancellation of the leakage signal with stability while following variations in the leakage signal.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
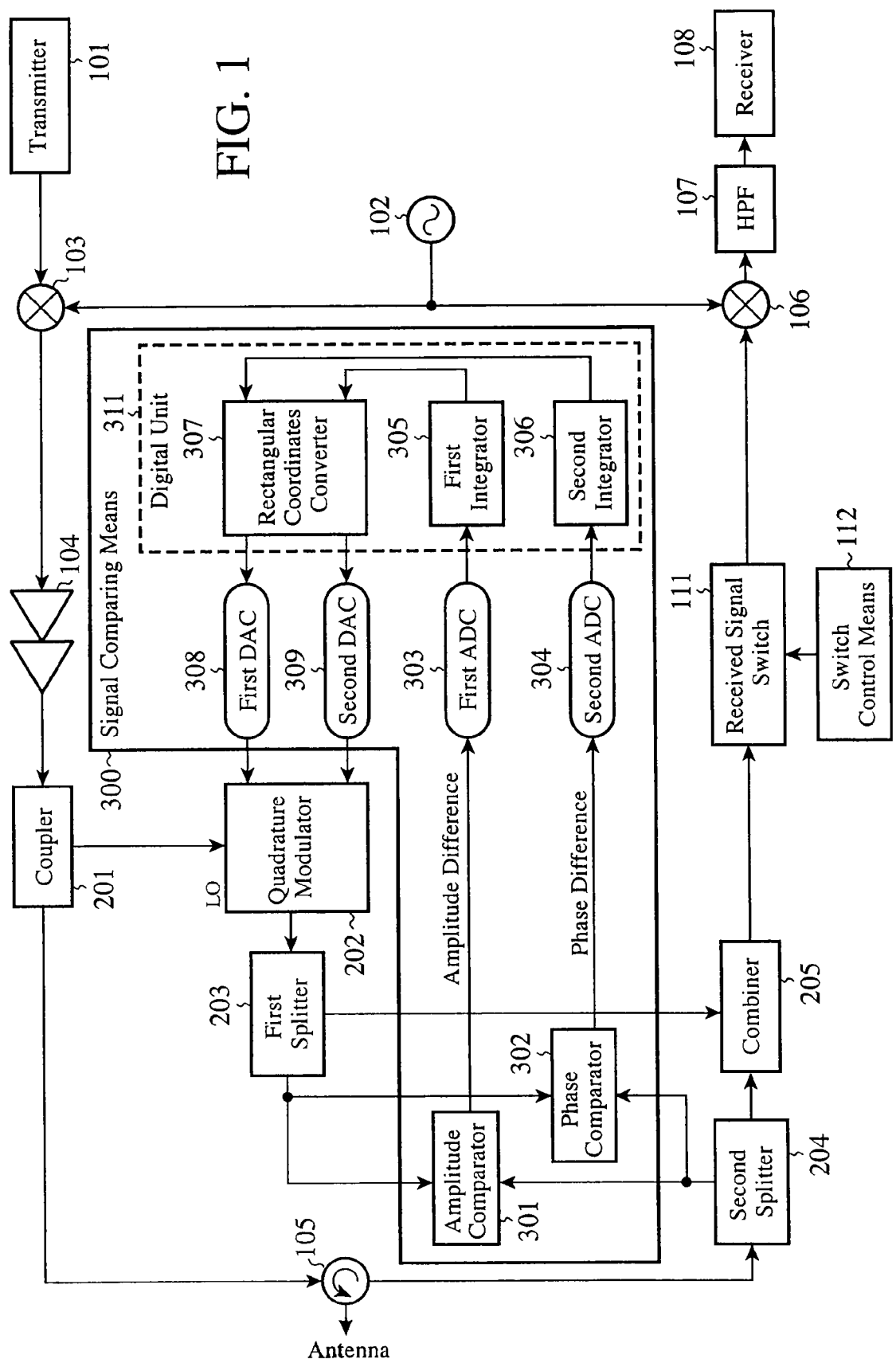
FIG. 1 is a block diagram showing a transceiver provided with a leakage signal cancellation apparatus in accordance with Embodiment 1 of the present invention.

FIG. 1 is a block diagram showing a transceiver provided with a leakage signal cancellation apparatus in accordance with Embodiment 1 of the present invention.

The transceiver shown is provided with a transmitter 101, a local oscillator 102, a first mixer 103, a power amplifier 104, a circulator 105, a second mixer 106, a high pass filter (HPF) 107, a receiver 108, a coupler 201, a quadrature modulator 202, a first splitter 203, a second splitter 204, a combiner 205, an amplitude comparator 301, a phase comparator 302, a first A/D converter (a first ADC) 303, a second A/D converter (a second ADC) 304, a first integrator 305, a second integrator 306, a rectangular coordinates converter 307, a first D/A converter (a first DAC) 308, a second D/A converter (a second DAC) 309, a received signal switch 111, and a switch control means 112.

The first integrator 305 through the rectangular coordinates converter 307 are a digital unit 311 for processing a digital signal, and a signal comparing means 300 is constructed of the amplitude comparator 301 through the second D/A converter 309 containing this digital unit 311. The leakage signal cancellation apparatus for canceling out a leakage signal is implemented by a structure including the coupler 201 through the signal comparing means 300.

The transmitter 101 is the one for outputting a transmitted signal in a baseband or of an intermediate frequency. The local oscillator 102 is the one which oscillates to generate a carrier wave. The first mixer 103 multiplies the transmitted signal in the baseband or of the intermediate frequency which is outputted by the transmitter 101 by the local oscillation signal outputted by the local oscillator 102 so as to perform on/off modulation on the carrier wave. The power amplifier 104 is the one which carries out power amplification of the transmitted signal. The circulator 105 is the one for furnishing the transmitted signal which is outputted by the power amplifier 104 to an antenna not shown in the figure, and for dividing a received signal from the antenna. The second mixer 106 is the one for mixing the received signal with the local oscillation signal which is outputted by the local oscillator 102 so as to convert the received signal to a signal in the baseband or of the intermediate frequency. The receiver 108 is the one for processing the received signal in the baseband or of the intermediate frequency on which the frequency conversion is performed by the second mixer 106. The high pass filter 107 is the one for removing a dc component from the signal outputted from the second mixer 106.

The coupler 201 is the one which divides a part of the transmitted signal which is outputted by the power amplifier 104, and the quadrature modulator 202 is the one which adjusts the amplitude and phase of the part of the transmitted signal which is divided by the coupler 201 so as to generate a cancel signal and is so constructed as to generate the cancel signal on the basis of I and Q signals which are outputted from the signal comparing means 300.

The first splitter 203 is the one which makes the cancel signal which is outputted by the quadrature modulator 202 be in opposite phase with the original one and splits it, and the second splitter 204 is the one which divides a part of the received signal before the received signal is combined with the cancel signal by the combiner 205. The combiner 205 is the one which combines the output signal of the first splitter 203 with the received signal. The amplitude comparator 301 is the one which compares the amplitude of the cancel signal which is outputted by the first splitter 203 with that of the received signal which is outputted by the second splitter 204, and the phase comparator 302 is the one which compares the phase of the cancel signal which is outputted by the first splitter 203 with that of the received signal which is outputted by the second splitter 204.

The first A/D converter 303 and the second A/D converter 304 are the ones which perform A/D conversion on an amplitude difference signal and a phase difference signal which are outputted by the amplitude comparator 301 and the phase comparator 302, respectively, and the first integrator 305 and the second integrator 306 are the ones which integrate the amplitude difference signal and the phase difference signal which are outputted by the first and second A/D converters, respectively.

The rectangular coordinates converter 307 is a signal processing circuit which inputs amplitude data which are outputted by the first integrator 305 and phase data which are outputted by the second integrator 306, and which performs polar-coordinates-to-rectangular-coordinates conversion on them. The first D/A converter 308 and the second D/A converter 309 are the ones which perform D/A conversion on the outputs of the rectangular coordinates converter 307, respectively. As mentioned above, the signal comparing means 300 for comparing the amplitude and phase of the cancel signal which is generated by the quadrature modulator 202 with those of the received signal so as to output a signal corresponding to the result of the comparison is constructed of the above-mentioned amplitude comparator 301 through the above-mentioned second D/A converter 309. The received signal switch 111 is the one which makes a connection or disconnection between the output of the combiner 205 and the input of second mixer 106. The switch control means 112 is a control unit for carrying out on/off control of the received signal switch 111, and its concrete control operation will be explained later.

Next, the operation of the transceiver of Embodiment 1 will be explained.

First, a part of the transmitted signal (a carrier wave) which is divided by the coupler 201 is led to an LO input of the quadrature modulator 202. The quadrature modulator 202 adjusts the amplitude and phase of the divided part of the transmitted signal using I and Q signals which are outputted by the first and second D/A converters 308 and 309, and outputs a cancel signal. The cancel signal is made to be in opposite phase with the original one and is split by the first splitter 203, and the cancel signal which is outputted in opposite phase with the original one is combined with the received signal by the combiner 205, so that the leakage signal included in the received signal is cancelled out.

On the other hand, a part of the received signal before the received signal is combined with the cancel signal by the combiner 205 is divided by the second splitter 204. The cancel signal which is outputted by the first splitter 203 and the part of the received signal which is outputted by the second splitter 204 are inputted to both the amplitude comparator 301 and the phase comparator 302. The amplitude comparator 301 and the phase comparator 302 compare the amplitude and phase of the cancel signal which is split by the first splitter 203 with those of the received signal which is split by the second splitter 204, respectively, and output a signal having a value proportional to the amplitude difference between them and a signal having a value proportional to the phase difference between them, respectively. The first and second A/D converters 303 and 304 perform A/D conversion on the amplitude difference signal and the phase difference signal which are outputted by the amplitude comparator 301 and the phase comparator 302, respectively. The amplitude difference signal and the phase difference signal which are outputted by the first and second A/D converters are integrated by the first and second integrators 305 and 306, respectively, so that they become amplitude data and phase data respectively.

The rectangular coordinates converter 307 inputs the amplitude data which are outputted by the first integrator 305 and the phase data which are outputted by the second integrator 306, and perform polar-coordinates-to-rectangular-coordinates conversion on them. The first and second D/A converters 308 and 309 perform D/A conversion on the outputs of the rectangular coordinates converter 307, respectively. These signals are inputted, as I and Q signals, to the quadrature modulator 202.

For example, in a case in which the amplitude of the received signal divided by the second splitter 204 is larger (or smaller) than that of the cancel signal split by the first splitter 203, the amplitude data which are outputted by the first integrator 305 increase (or decrease) because the amplitude comparator 301 outputs a positive (or negative) signal having a value proportional to the amplitude difference between them. Then, the amplitudes of the I and Q signals which the rectangular coordinates converter 307 acquires by performing D/A conversion on the results of the rectangular coordinates conversion of the amplitude data and the phase data (the amplitudes of the outputs of the first and second D/A converters 308 and 309) increase (or decrease), and hence the amplitude of the cancel signal which the quadrature modulator 202 generates by performing quadrature modulation on the I and Q signals also increases (or decreases). This control operation is always performed in such a manner that the amplitude of the received signal becomes equal to that of the cancel signal.

On the other hand, also as for the phase, in a case in which the phase of the received signal which is divided by the second splitter 204 leads (or lags) the cancel signal which is split by the first splitter 203, the phase data which are outputted by the second integrator 306 increase (or decrease) because the phase comparator 302 outputs a positive (or negative) signal having a value proportional to the phase difference between them. Then, the phases of the I and Q signals which the rectangular coordinates converter 307 acquires by performing D/A conversion on the results of the rectangular coordinates conversion of the amplitude data and the phase data (the phases of the outputs of the first and second D/A converters 308 and 309) lead (or lag), and hence the phase of the cancel signal which the quadrature modulator 202 generates by performing quadrature modulation on the I and Q signals also leads (or lags). This control operation is always performed in such a manner that the received signal and the cancel signal are in phase with each other.

In the above-mentioned way, the amplitude and phase of the cancel signal which is split by the first splitter 203 are controlled in such a manner that the cancel signal has the same amplitude as the received signal which is divided by the second splitter 204 and the cancel signal is in phase with the received signal. Because this cancel signal is made to be in opposite phase with the original one and is split by the first splitter 203, and is combined with the received signal by the combiner 205, the leakage signal included in the received signal is canceled out.

Because the feedback control works and a large leakage signal is inputted to the second mixer 106 during operation until the leakage signal is canceled out, the switch control means 112 turns off the received signal switch 111 to disconnect between the output of the combiner 205 and the input of the second mixer 106. More specifically, the switch control means 112 controls the received signal switch 111 as follows.

First, the switch control means transmits an unmodulated carrier wave for learning of the leakage signal cancellation apparatus during a fixed time interval, and performs the above-mentioned control operation during the time interval in such a manner that the leakage signal is canceled out. When starting the transmission of the carrier wave, the switch control means 112 carries out off-control of the received signal switch 111. The switch control means then turns on the received signal switch 111 by performing one of the following control operations.

1) The switch control means determines the length of the fixed time interval which is required to cancel out the leakage signal sufficiently, and, on the basis of information on this fixed time interval, turns on the received signal switch 111 after the expiration of the fixed time interval.

2) When the difference in amplitude between the leakage signal and the cancel signal reaches a fixed value and the difference in phase between them also reaches a fixed value in the signal comparing means 300, the switch control means turns on the received signal switch 111.

3) A level detector is disposed as a backward stage of the combiner 205, and, when the output level of the combiner 205 becomes equal to or lower than a fixed value, the switch control means turns on the received signal switch 111 by assuming that the leakage signal is sufficiently canceled out.

Because the on/off control of the received signal switch 111 is thus carried out, no large leakage signal is inputted to the second mixer 106, and therefore a mixer which can withstand an input of large signal power does not need to be used as the second mixer. As a result, a low-cost RFID system and a low-cost radar apparatus can be implemented.

In the above explanation, as a case in which the maximum input power of the second mixer 106 is not sufficiently large, the example using the received signal switch 111 and the switch control means 112 is shown, though in a case in which the maximum input power of the second mixer 106 is large or in a case in which the original leakage signal is not large, the received signal switch 111 and the switch control means 112 can be eliminated.

In the above-explained example, the feedback control is performed in such a manner that the cancel signal has the same amplitude as the leakage signal and is in phase with the leakage signal. As an alternative, the feedback control can be performed in such a manner that an antiphase cancel signal has the same amplitude as the leakage signal and is in opposite phase with the leakage signal, the antiphase cancel signal is generated by the quadrature modulator, and the received signal and the antiphase composite signal are combined in phase with each other so that the leakage signal is canceled out.

More specifically, in the structure of this example, the quadrature modulator 202 generates the antiphase cancel signal, and the signal comparing means 300 compares the amplitude and phase of the antiphase cancel signal which is generated by the quadrature modulator 202 with those of the received signal, and outputs a signal corresponding to the comparison results. The quadrature modulator 202 and the signal comparing means 300 perform feedback control in such a manner that the antiphase cancel signal has the same amplitude as the leakage signal and is in opposite phase with the leakage signal. In this case, the combiner 205 uses, as the first splitter 203, an in-phase splitter instead of the antiphase splitter in order to in-phase combine the antiphase cancel signal and the received signal which are outputted from the quadrature modulator 202.

As mentioned above, the leakage signal cancellation apparatus according to Embodiment 1, which cancels out a leakage signal which is leakage of a transmitted signal to a received signal in a transceiver, includes: the quadrature modulator for dividing a part of the transmitted signal so as to generate a cancel signal; the signal comparing means for comparing the amplitude and phase of the cancel signal generated by the quadrature modulator with those of the received signal, and for outputting signals corresponding to the results of the comparison; and the combiner for combining the received signal with an antiphase cancel signal whose phase is made to be opposite to that of the cancel signal outputted from the quadrature modulator so as to cancel out the leakage signal, and the quadrature modulator generates the cancel signal on the basis of the output signals outputted by the signal comparing means and the quadrature modulator and the signal comparing means perform feedback control in such a manner that the cancel signal has the same amplitude as the leakage signal and is in phase with the leakage signal. Therefore, the leakage signal cancellation apparatus can acquire the cancel signal certainly, and can implement the cancellation of the leakage signal with stability while following variations in the leakage signal.

As an alternative, the leakage signal cancellation apparatus according to Embodiment 1, which cancels out a leakage signal which is leakage of a transmitted signal to a received signal in a transceiver, includes: the quadrature modulator for dividing a part of the transmitted signal so as to generate an antiphase cancel signal; the signal comparing means for comparing the amplitude and phase of the antiphase cancel signal generated by the quadrature modulator with those of the received signal, and for outputting signals corresponding to the results of the comparison; and the combiner for combining the received signal with the antiphase cancel signal outputted from the quadrature modulator so as to cancel out the leakage signal, and the quadrature modulator generates the antiphase cancel signal on the basis of the output signals outputted by the signal comparing means and the quadrature modulator and the signal comparing means perform feedback control in such a manner that the antiphase cancel signal has the same amplitude as the leakage signal and is in opposite phase with the leakage signal. Therefore, the leakage signal cancellation apparatus can acquire the cancel signal certainly, and can implement the cancellation of the leakage signal with stability while following variations in the leakage signal.

In addition, because the leakage signal cancellation apparatus according to Embodiment 1 includes the received signal switch disposed as a backward stage of the combiner, and the switch control means for performing on/off control of the received signal switch, no large leakage signal is inputted to the mixer disposed behind the combiner, and therefore any mixer which withstands an input of large signal power does not need to be used. As a result, a low-cost RFID system and a low-cost radar apparatus can be implemented.

Embodiment 2

In above-mentioned Embodiment 1, the amplitude and phase of a part of the transmitted signal which is divided by the coupler 201 are led to the LO input of the quadrature modulator 202, and the transmitted signal is adjusted in such a manner as to have the same amplitude as the received signal and to be in phase with the received signal. The quadrature modulator is generally comprised of a mixer. Under the conditions that the voltages of I and Q signals which are inputted to the quadrature modulator are fixed, there is a nonlinear relation between the level of the signal led to the LO input and that of the output signal of the quadrature modulator, and therefore, when the level of the signal led to the LO input is less than a level required for the operation of the mixer, the quadrature modulator stops running. Because the quadrature modulator has such a characteristic, when the interrogator transmits an amplitude-modulated signal or an on/off modulated signal, for either a symbol with a small signal amplitude or a symbol which makes the carrier wave be off, the level of the signal led to the LO input of the quadrature modulator 202 becomes lower than the level required for the operation of the mixer and therefore the quadrature modulator 202 stops running.

As a result, the feedback control cannot be carried out properly, and an abnormal value of the amplitude difference or the phase difference is inputted. If so, even after a feedback loop is formed for a symbol with a large signal amplitude or a symbol which makes the carrier wave be on, the cancel signal cannot follow the leakage signal for a while. As a result, there arises a problem that the leakage signal cannot be sufficiently canceled out.

From this point of view, in accordance with Embodiment 2, a vector modulator is used instead of the quadrature modulator 202. When I and Q signals inputted to the vector modulator have constant voltages, there is a linear relationship between the level of a signal led to the RF input and the level of an output signal of the vector modulator (that is, the level of the output signal of the quadrature modulator decreases by 1 dB as the level of the input signal led to the RF input is decreased by 1 dB), and, even when the level of the signal led to the RF input is small, the vector modulator can be prevented from stopping running. Furthermore, for a signal containing a variation in its signal level, which is led to the RF input, its amplitude gain and phase shift amount can be controlled using with the I and Q signals inputted to the vector modulator. Therefore, even when the interrogator transmits an amplitude-modulated signal or an on/off modulated signal, the feedback control works correctly and the cancel signal is made to follow the leakage signal so that the leakage signal can be sufficiently cancelled out. Because the other structural components of the leakage signal cancellation apparatus, except for this structure, are the same as those of Embodiment 1, the explanation of the other structural components will be omitted hereafter.

As mentioned above, because the leakage signal cancellation apparatus according to Embodiment 2 uses the vector modulator instead of the quadrature modulator which adjusts the amplitude and phase of the cancel signal, even when the interrogator transmits an amplitude-modulated signal or an on/off modulated signal, the feedback control works correctly and the cancel signal is made to follow the leakage signal so that the leakage signal can be sufficiently cancelled out. As a result, the interrogator can be used even in a low-cost RFID system and a low-cost radar apparatus each of which transmits an amplitude-modulated signal or an on/off modulated signal.

Embodiment 3

In above-mentioned Embodiment 1, the amplitude and phase of a part of the transmitted signal which is divided by the coupler 201 are led to the LO input of the quadrature modulator 202, and the transmitted signal is adjusted in such a manner as to have the same amplitude as the received signal and to be in phase with the received signal. As mentioned above, the quadrature modulator is generally comprised of a mixer, and therefore, when the level of a signal inputted to the LO input is less than a level required for the operation of the mixer, the quadrature modulator stops running. Therefore, in a case in which the interrogator transmits an amplitude-modulated signal or an on/off modulated signal, there arises a problem that the leakage signal cannot be sufficiently canceled out.

From this point of view, in accordance with Embodiment 3, the switch control means 112 carries out a control operation to turn off the received signal switch 111 while in the RFID system the interrogator transmits a command to a transponder using an on/off modulated signal. Because the other structural components of the leakage signal cancellation apparatus, except for this structure, are the same as those of Embodiment 1 or 2, the explanation of the other structural components will be omitted hereafter. In the above-mentioned example, in a case in which the transmitted signal is an on/off modulated signal, the switch control means turns off the received signal switch 111. Even in a case in which the transmitted signal is not an on/off modulated signal, but is an amplitude modulation or a phase modulation signal having such a small signal level to make the quadrature modulator 202 be unable to run normally, this embodiment can be applied similarly.

As mentioned above, because the leakage signal cancellation apparatus according to Embodiment 3 includes the received signal switch disposed as a backward stage of the combiner, and the switch control means which turns off the received signal switch in a case in which the transmitted signal is a modulated signal having a state in which its signal level is equal to or lower than a predetermined level, even when the leakage signal cannot be sufficiently canceled out, no large leakage signal is inputted to the mixer disposed as a backward stage of the combiner and therefore it is not necessary to use a mixer which withstands an input of large signal power. As a result, a low-cost RFID system and a low-cost radar apparatus can be implemented.

In accordance with above-mentioned Embodiment 3, in a case in which the transmitted signal is a modulated signal having a state in which its signal level is equal to or lower than a predetermined level, the switch control means turns off the received signal switch 111. As an alternative, the following control can be carried out. More specifically, before transmitting such an on/off modulated signal, the leakage signal cancellation apparatus can perform learning of the cancel signal in advance by performing the feedback control of the quadrature modulator 202 and the signal comparing means 300, and can hold an input signal from the signal comparing means 300 to the quadrature modulator 202. By doing in this way, the leakage signal cancellation apparatus can combine the cancel signal always having an appropriate amplitude and an appropriate phase with the on/off modulated signal, and therefore can cancel out the leakage signal effectively. As such the structure for holding an input signal, a structure which will be mentioned below in Embodiment 6 or the like can be used.

Embodiment 4

In above-mentioned Embodiment 3, the received signal switch 111 is turned off during transmission of the on/off modulated signal so that the circuit can be protected. Hereafter, a leakage signal cancellation apparatus which can cancel out the leakage signal by performing a control operation even during transmission of the on/off modulated signal is shown as Embodiment 4.

Figure 2:
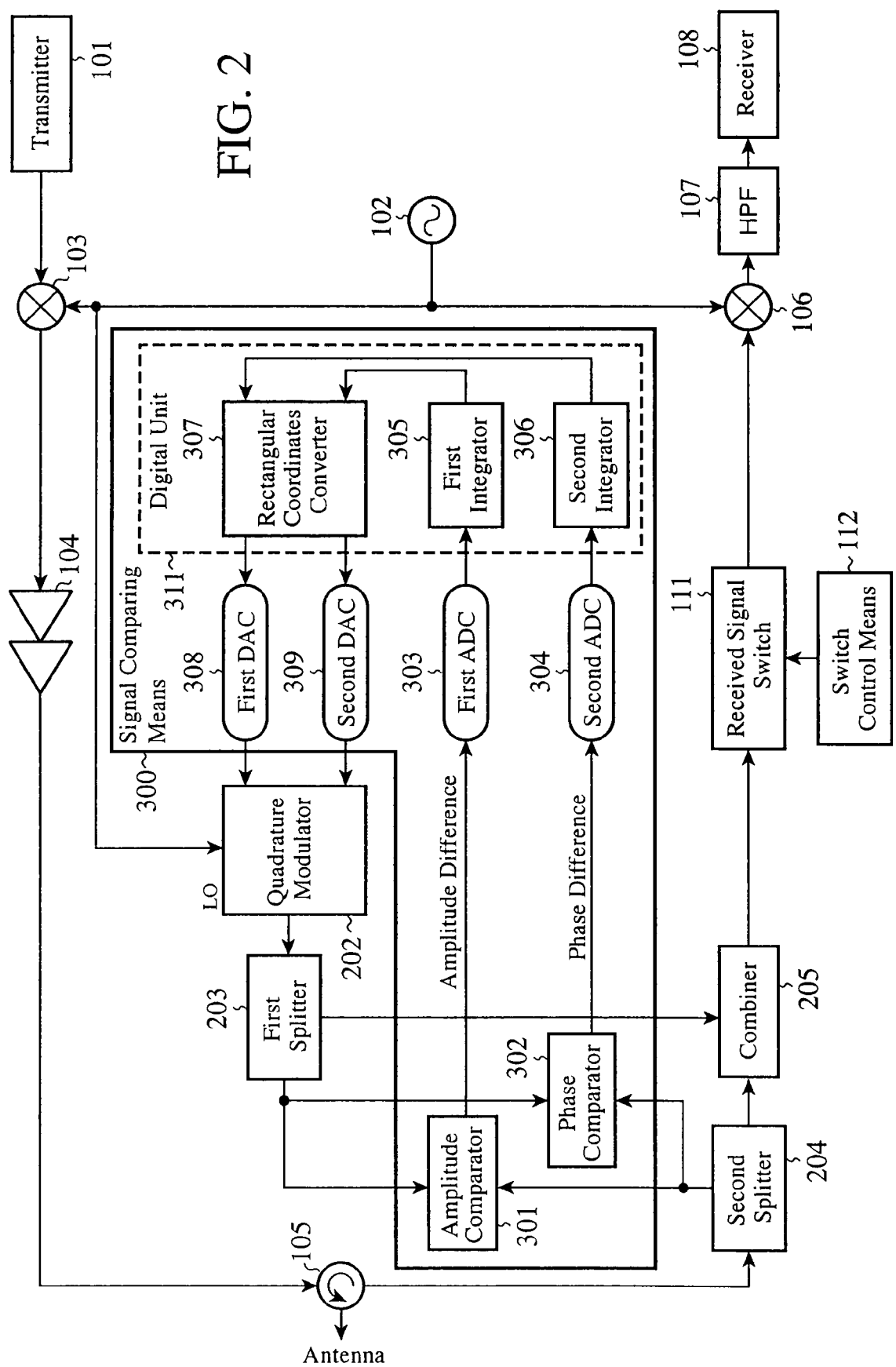
FIG. 2 is a block diagram showing a transceiver provided with a leakage signal cancellation apparatus in accordance with Embodiment 4 of the present invention.

FIG. 2 is a block diagram showing a transceiver equipped with the leakage signal cancellation apparatus of Embodiment 4.

In the figure, a carrier wave which is generated by the local oscillator 102 is furnished to the LO input of the quadrature modulator 202. More specifically, the LO input of the quadrature modulator 202 is connected to the coupler 201 in Embodiment 1, whereas the LO input of the quadrature modulator is connected to the output signal of the local oscillator 102 in Embodiment 4. Because the other structure of this embodiment, except for this structure, is the same as that shown in FIG. 1 (the structure of either one of Embodiments 1 to 3), corresponding components are designated by the same reference numerals as those shown in FIG. 1 and the explanation of these components will be omitted hereafter.

In Embodiment 4, because the carrier wave which is generated by the local oscillator 102 is always inputted to the LO input of the quadrature modulator 202, the input to the LO input is not lost. Therefore, the leakage signal cancellation apparatus can run normally even during transmission of the on/off modulated signal.

Also in the case of Embodiment 4, as in the case of a variant of Embodiment 1, the leakage signal cancellation apparatus can perform the feedback control in such a manner that the antiphase cancel signal has the same amplitude as the leakage signal and is in opposite phase with the leakage signal, generates the antiphase cancel signal using the quadrature modulator, and in-phase combines the received signal and the antiphase composite signal so as to cancel out the leakage signal. The structure in this case is the same as that of the variant of Embodiment 1 with the exception that the quadrature modulator 202 generates the antiphase cancel signal on the basis of the signal from the local oscillator 102.

As mentioned above, the leakage signal cancellation apparatus according to Embodiment 4, which cancels out a leakage signal which is leakage of a transmitted signal to a received signal in a transceiver, includes: the quadrature modulator for generating a cancel signal on the basis of a signal from the local oscillator for generating a carrier wave for the transmitted signal; the signal comparing means for comparing the amplitude and phase of the cancel signal generated by the quadrature modulator with those of the received signal, and for outputting signals corresponding to the results of the comparison; and the combiner for combining the received signal with an antiphase cancel signal whose phase is made to be opposite to that of the cancel signal outputted from the quadrature modulator so as to cancel out the leakage signal, and the quadrature modulator operates at all times with the local oscillation signal from the local oscillator and generates the cancel signal on the basis of the output signals outputted by the signal comparing means, and the quadrature modulator and the signal comparing means perform feedback control in such a manner that the cancel signal has the same amplitude as the leakage signal and is in phase with the leakage signal. As a result, for example, even when transmitting an on/off modulated signal, the leakage signal cancellation apparatus can output the cancel signal having a normal value, and therefore, even in this case, no large leakage signal is inputted to the mixer disposed as a backward stage of the combiner and it is not necessary to use a mixer which withstands an input of large signal power.

Furthermore, the leakage signal cancellation apparatus according to a variant of Embodiment 4, which cancels out a leakage signal which is leakage of a transmitted signal to a received signal in a transceiver, includes: the quadrature modulator for generating an antiphase cancel signal on the basis of a signal from the local oscillator for generating a carrier wave for the transmitted signal; the signal comparing means for comparing the amplitude and phase of the antiphase cancel signal generated by the quadrature modulator with those of the received signal, and for outputting signals corresponding to the results of the comparison; and the combiner for combining the received signal with the antiphase cancel signal outputted from the quadrature modulator so as to cancel out the leakage signal, and the quadrature modulator operates at all times with the local oscillation signal from the local oscillator and generates the antiphase cancel signal on the basis of the output signals outputted by the signal comparing means, and the quadrature modulator and the signal comparing means perform feedback control in such a manner that the antiphase cancel signal has the same amplitude as the leakage signal and is in opposite phase with the leakage signal. As a result, for example, even when transmitting an on/off modulated signal, the leakage signal cancellation apparatus can output the cancel signal having a normal value, and therefore, even in this case, no large leakage signal is inputted to the mixer disposed as a backward stage of the combiner and it is not necessary to use a mixer which withstands an input of large signal power.

Embodiment 5

In above-mentioned Embodiment 2, the leakage signal cancellation apparatus uses the vector modulator, instead of the quadrature modulator, cancels out the leakage signal at all times even when the interrogator transmits an amplitude-modulated signal or an on/off modulated signal. A leakage signal cancellation apparatus which can cancel out the leakage signal even during transmission of an amplitude-modulated signal or an on/off modulated signal by using a quadrature modulator without using a vector modulator is shown as Embodiment 5.

Figure 3:
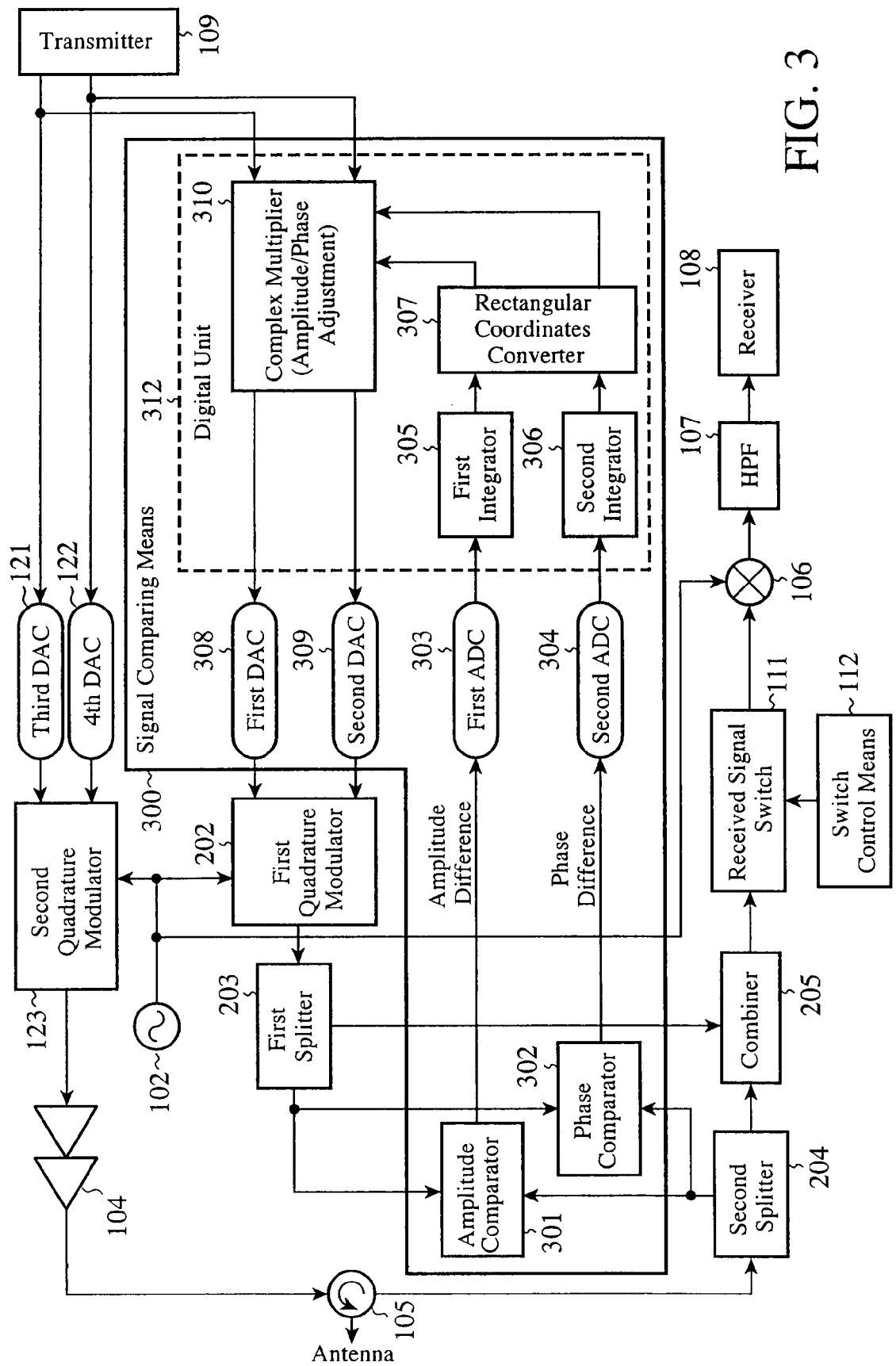
FIG. 3 is a block diagram showing a transceiver provided with a leakage signal cancellation apparatus in accordance with Embodiment 5 of the present invention.

FIG. 3 is a block diagram showing a transceiver equipped with the leakage signal cancellation apparatus according to Embodiment 5.

In the figure, a transmitter 109 outputs digital signals of I and Q channels, and differs from the transmitter 101 in that the transmitter 109 outputs the digital I and Q signals. Third and fourth D/A converters (a third DAC and a fourth DAC) 121 and 122 are the ones which convert the digital signals of I and Q channels into analog signals, respectively, and a second quadrature modulator 123 is the one which quadrature-modulates a local oscillation signal which is outputted by the local oscillator 102 with the analog signals of I and Q channels which are outputted by the third and fourth D/A converters 121 and 122. Reference numeral 310 denotes a complex multiplier which carries out complex multiplication of the digital I and Q signals which are outputted by the transmitter 109 by the output of the rectangular coordinates converter 307, and the first and second integrators 305 and 306, the rectangular coordinates converter 307, and the complex multiplier 310 construct the digital unit 312. Because the other structural components of this embodiment, except for this structure, are the same as those shown in FIG. 1, corresponding components are designated by the same reference numerals as those shown in FIG. 1 and the explanation of these components will be omitted hereafter.

Next, the operation of the leakage signal cancellation apparatus will be explained. If the complex multiplier 310 is not disposed, the output of the quadrature modulator 202 and the output of the second quadrature modulator 123 are an identical modulated signal. Therefore, the output of the quadrature modulator 202 and the output of the power amplifier 104 are also the same modulated signal, though they differ from each other in their signal levels. That is, the output of the first quadrature modulator 202 corresponds to a signal which is a part divided from the output of the power amplifier 104 by the coupler 201 shown in FIG. 1. The leakage signal cancellation apparatus operates in the same way that the leakage signal cancellation apparatus of Embodiment 1 does to adjust the amplitude and phase of this modulated signal and generate the cancel signal, and performs feedback control in such a manner that the cancel signal has the same amplitude as the leakage signal and is in phase with the leakage signal. Concretely, the leakage signal cancellation apparatus carries out complex multiplication of the output of the rectangular coordinates converter 307 by the digital I and Q signals which are outputted by the transmitter 109 by using the complex multiplier 310 so as to adjust the amplitude and phase of the modulated signal. With such the structure, the leakage signal cancellation apparatus performs the feedback control properly even when the interrogator transmits an amplitude-modulated signal or an on/off modulated signal, so that the cancel signal can follow the leakage signal and the leakage signal can be sufficiently canceled out.

In the above explanation, the leakage signal cancellation apparatus generates the cancel signal using the quadrature modulator (the quadrature modulator 202), and can alternatively use a vector modulator for the first and second quadrature modulators 202 and 123.

Also in the case of Embodiment 5, as in the case of a variant of Embodiment 1, the leakage signal cancellation apparatus can perform the feedback control in such a manner that the antiphase cancel signal has the same amplitude as the leakage signal and is in opposite phase with the leakage signal, generates the antiphase cancel signal using the quadrature modulator, and in-phase combines the received signal and the antiphase composite signal so as to cancel out the leakage signal.

As mentioned above, the leakage signal cancellation apparatus according to Embodiment 5 divides the digital signals of I and Q channels which are outputted by the transmitter into two groups, uses one of them so as to quadrature-modulate the carrier wave to generate the transmitted signal and also uses the other one of them so as to carry out complex multiplication of the other one with data which are acquired from the results of the comparison between the cancel signal and the received signal to generate the cancel signal whose amplitude and phase are adjusted, and then carries out the feedback control in such a manner that the cancel signal has the same amplitude as the leakage signal and is in phase with the leakage signal. Therefore, the leakage signal cancellation apparatus performs the feedback control properly even when the interrogator transmits an amplitude-modulated signal or an on/off modulated signal, so that the cancel signal can follow the leakage signal and the leakage signal can be sufficiently canceled out. As a result, the interrogator can be used even in a low-cost RFID system and a low-cost radar apparatus each of which transmits an amplitude-modulated signal or an on/off modulated signal.

Furthermore, the leakage signal cancellation apparatus in accordance with the variant of Embodiment 5 divides the digital signals of I and Q channels which are outputted by the transmitter into two groups, uses one of them to quadrature-modulate the carrier wave to generate the transmitted signal and also uses the other one of them to carry out complex multiplication of the other one with data which are acquired from the results of the comparison between the antiphase cancel signal and the received signal to generate the antiphase cancel signal whose amplitude and phase are adjusted, and then carries out the feedback control in such a manner that the antiphase cancel signal has the same amplitude as the leakage signal and is in phase with the leakage signal. Therefore, the leakage signal cancellation apparatus performs the feedback control properly even when the interrogator transmits an amplitude-modulated signal or an on/off modulated signal, so that the cancel signal can follow the leakage signal and the leakage signal can be sufficiently canceled out. As a result, the interrogator can be used even in a low-cost RFID system and a low-cost radar apparatus each of which transmits an amplitude-modulated signal or an on/off modulated signal.

Embodiment 6

In any of the above-mentioned embodiments, the leakage signal cancellation apparatus carries out the feedback control at all times by adjusting the cancel signal in such a manner that the cancel signal has the same amplitude as the leakage signal and is in phase with the received signal, and by combining them out of phase with them being in opposite phase with each other in such a manner that the combined output becomes zero. However, if the leakage signal cancellation apparatus performs the feedback control during reception, the amplitude and phase of the cancel signal which is combined with the received signal vary due to the feedback control during reception, and has interference on the received signal. Therefore, when the level of the received signal is small, there is a possibility that the leakage signal cancellation apparatus cannot demodulate the received signal. To solve this problem, a leakage signal cancellation apparatus in accordance with Embodiment 6 has a cancellation operation mode in which the leakage signal cancellation apparatus cancels out the leakage signal, and an adaptive operation mode in which the leakage signal cancellation apparatus generates the cancel signal according to the leakage signal which varies, and holds the cancel signal in such a manner as to keep the amplitude and phase of the signal at constant in the cancellation operation mode. More specifically, because, in general, the leakage signal does not change rapidly, the leakage signal cancellation apparatus can perform a cancellation operation even if it shifts to the cancellation operation mode after performing an adaptive operation on the cancel signal in the adaptive operation mode. Therefore, the leakage signal cancellation apparatus enters the cancellation operation mode during reception of a signal from a transponder, or the like.

Figure 4:
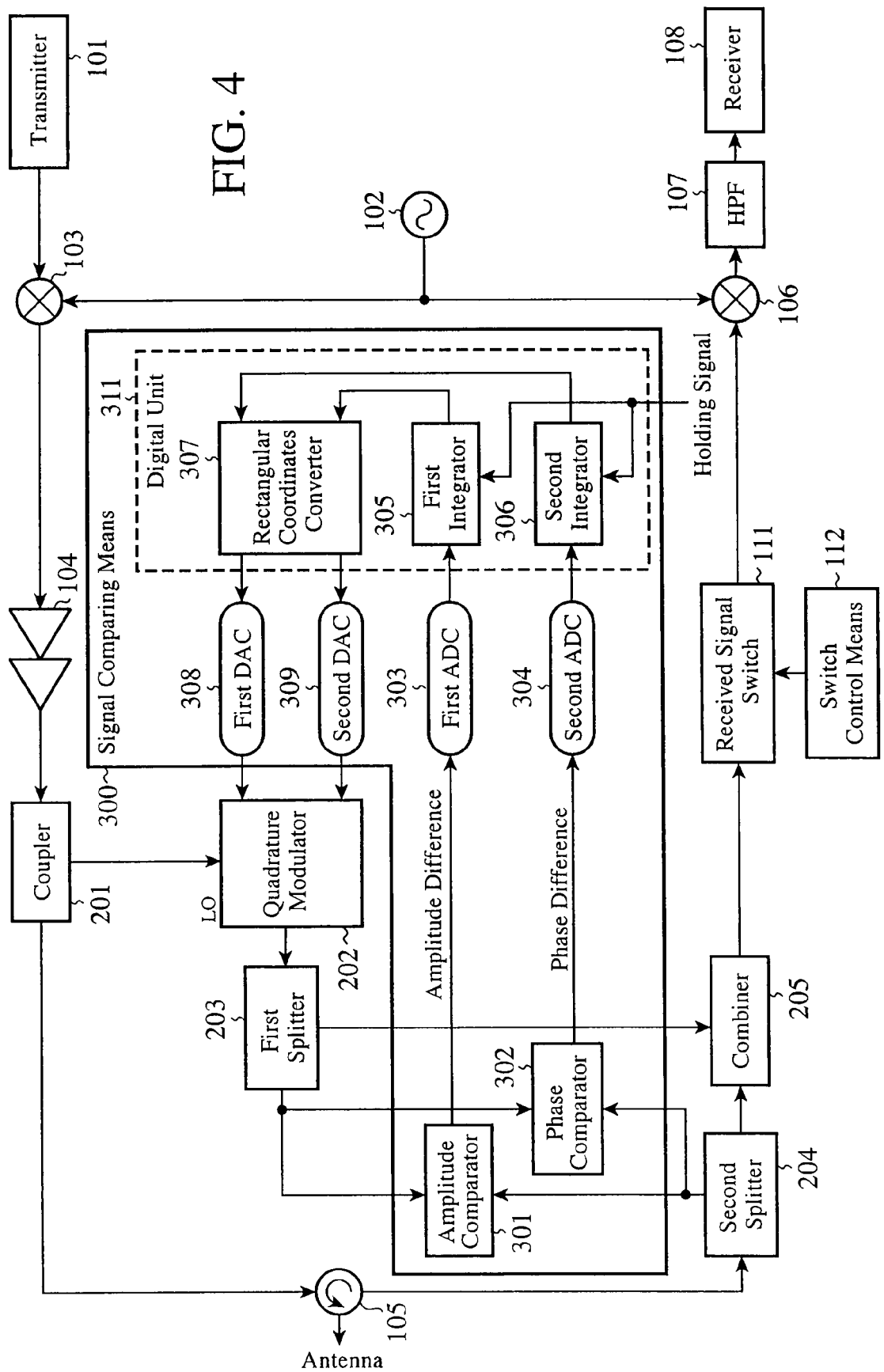
FIG. 4 is a block diagram showing a transceiver provided with a leakage signal cancellation apparatus in accordance with Embodiment 6 of the present invention.

FIG. 4 is a block diagram of a transceiver which uses the leakage signal cancellation apparatus according to Embodiment 6.

When the leakage signal cancellation apparatus shifts from the adaptive operation mode to the cancellation operation mode during reception, a holding signal is inputted from a control unit not shown in the figure to both the first integrator 305 and the second integrator 306 of the signal comparing means 300. As a result, the first integrator 305 and the second integrator 306 stop their integration control operations, and their outputs are then held. The I and Q signals which are outputted by the first and second D/A converters 308 and 309 are also held at fixed values, and therefore the cancel signal which is generated by the quadrature modulator 202 has a fixed value. Thus, the quadrature modulator 202 and the signal comparing means 300 can prevent any interference from being exerted upon the received signal by shifting from the adaptive operation mode to the cancellation operation mode.

For example, in a RFID system, an interrogator transmits a command which is on/off modulated first. Next, the interrogator receives a response from a transponder while transmitting an unmodulated carrier wave. At this time, the control unit not shown outputs the holding signal to both the first integrator 305 and the second integrator 306 as mentioned above. The received signal received by the interrogator is the addition of the leakage signal from the transmitter 101 to the response from the transponder. The leakage signal is an unmodulated carrier wave having a fixed amplitude and a fixed phase. After this leakage signal is mixed with the local oscillation signal from the local oscillator 102 by the second mixer 106 and is converted into a dc voltage, the leakage signal is removed by the high pass filter 107. The interrogator divides only the response signal from the transponder in this way and receives it by using the receiver 108.

At that time, in a case in which when performing the feedback control, the leakage signal cancellation apparatus follows the leakage signal without holding the I and Q signals of the comparing means 300, i.e., in a case in which the leakage signal cancellation apparatus runs while being in the adaptive operation mode, each of the amplitude and phase of the cancel signal continues to vary by a very small value (about 1 LSB of quantized I and Q signals) at all times. Therefore, the result which is obtained by mixing the leakage signal with the local oscillation signal does not become a fixed dc voltage, and the varying component passes through the high pass filter 107 and therefore has interference on the response signal when the response signal from the transponder has a very small level.

In contrast, by holding the I and Q signals of the signal comparing means 300 as the cancellation operation mode, the leakage signal cancellation apparatus makes the cancel signal outputted from the quadrature modulator 202 become an unmodulated carrier wave having a fixed amplitude and a fixed phase. Even if this cancel signal does not have the same amplitude as the leakage signal and is not in phase with the leakage signal, the signal which is the combination of the cancel signal and the leakage signal becomes an unmodulated carrier wave having a fixed amplitude and a fixed phase. Therefore, when the leakage signal is mixed with the local oscillation signal, the leakage signal becomes a dc voltage and can be removed by the high pass filter 107. In this case, because the signal which is the combination of the cancel signal and the leakage signal does not have such a large level to destroy the second mixer 106, no off control operation is carried out by the switch control means 112.

Because the other structural components and operation of this Embodiment, except for this structure and this operation, are the same as those of Embodiment 1 or 2 shown in FIG. 1, corresponding components are designated by the same reference numerals as those shown in FIG. 1 and the explanation of these components will be omitted hereafter.

In the above-mentioned structure, as the means for holding the I and Q signals of the signal comparing means 300, the example in which the holding signal is inputted to the first and second integrators 305 and 306 is shown. As an alternative, the holding signal can be inputted to the first and second D/A converters 308 and 309 so that their output values are kept constant, and this variant offers the same advantage. As long as the leakage signal cancellation apparatus is constructed in such a manner that the cancel signal provided to the combiner 205 becomes a signal having a constant value, as the cancellation operation mode, the leakage signal cancellation apparatus can have any kind of structure. Furthermore, this Embodiment can be applied to any of Embodiments 2 to 5.

As mentioned above, in the leakage signal cancellation apparatus according to Embodiment 6, the quadrature modulator and the signal comparing means have the cancellation operation mode in which the leakage signal cancellation apparatus cancels out the leakage signal, and the adaptive operation mode in which the leakage signal cancellation apparatus generates the cancel signal according to the leakage signal which varies, and hold the cancel signal in such a manner as to keep the cancel signal at constant in the cancellation operation mode. Therefore, the leakage signal cancellation apparatus can prevent any interference from being exerted upon the received signal due to the feedback control operation, and can therefore enable the receiver to demodulate the received signal properly even when the level of the received signal is small.

Embodiment 7

In accordance with above-mentioned Embodiment 6, the leakage signal cancellation apparatus has the cancellation operation mode in which the leakage signal cancellation apparatus cancels out the leakage signal, and the adaptive operation mode in which the leakage signal cancellation apparatus generates the cancel signal according to the leakage signal which varies, and holds the cancel signal in such a manner as to keep the amplitude and phase of the signal at constant in the cancellation operation mode. The leakage signal cancellation apparatus in accordance with above-mentioned Embodiment 6 is modified from that of Embodiment 1 in such a manner that the leakage signal cancellation apparatus holds the cancel signal in the cancellation operation mode. Hereafter, a leakage signal cancellation apparatus which is modified from that shown in nonpatent reference 1 in such a manner that the leakage signal cancellation apparatus holds the cancel signal in the cancellation operation mode is shown as Embodiment 7.

Figure 5:
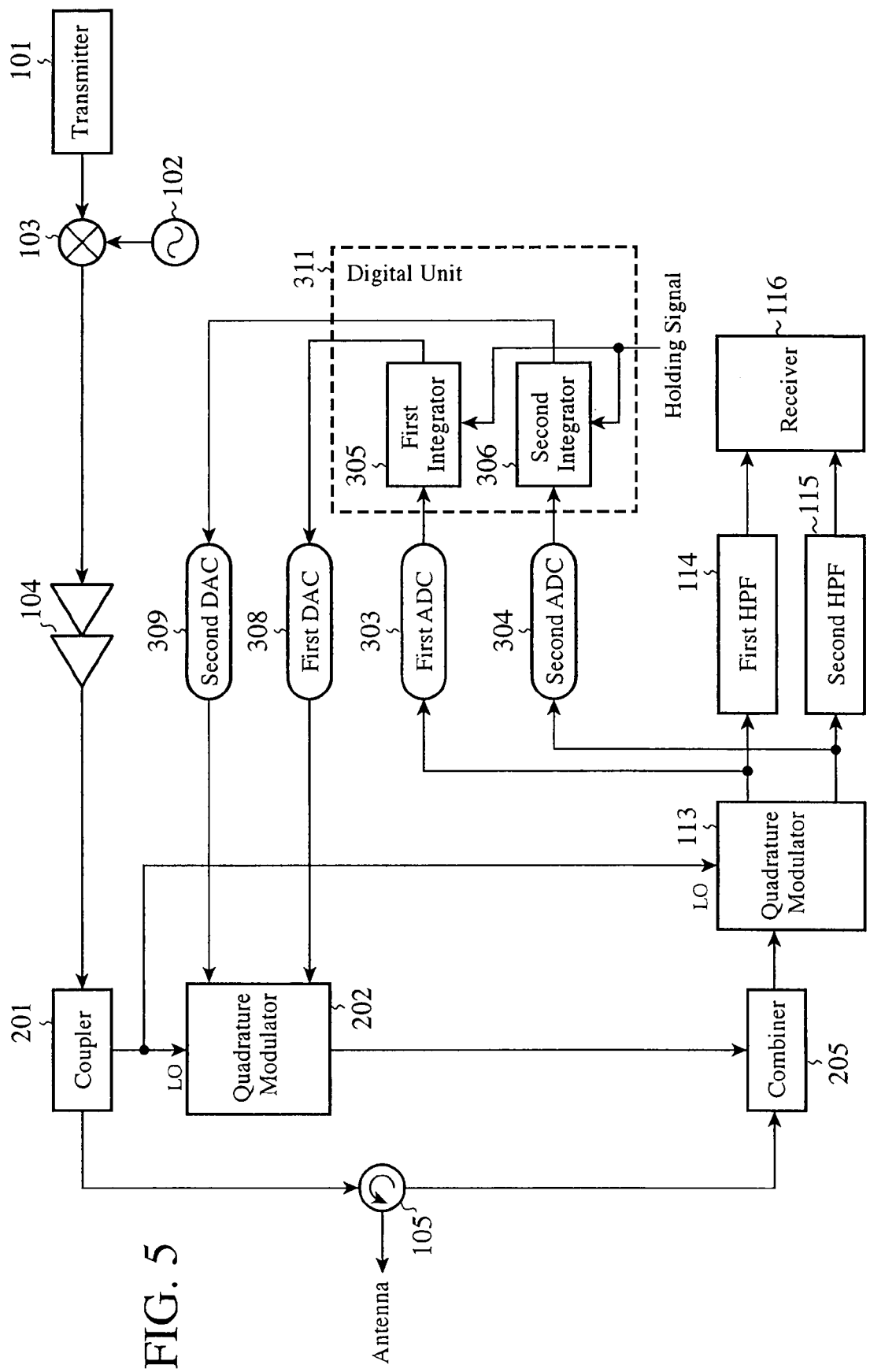
FIG. 5 is a block diagram showing a transceiver provided with a leakage signal cancellation apparatus in accordance with Embodiment 7 of the present invention.

FIG. 5 is a block diagram of a transceiver which uses the leakage signal cancellation apparatus of Embodiment 7. The operation of the transceiver of Embodiment 7 will be explained.

First, a part of a transmitted signal (a carrier wave) which is divided by the coupler 201 is inputted to the LO input of the quadrature modulator 202. The quadrature modulator 202 adjusts the amplitude and phase of the divided signal by using the I and Q signals which are outputted by the first and second D/A converters 308 and 309, and outputs the cancel signal. The cancel signal is combined out of phase with the received signal by the combiner 205, so that the leakage signal included in the received signal is canceled out.

On the other hand, the received signal which has been combined with the cancel signal by the combiner 205 is converted into baseband I and Q signals by a quadrature demodulator 113. The signal which is the part of the transmitted signal divided by the coupler 201 is inputted to the LO input of this quadrature demodulator 113. The baseband I and Q signals which are outputted by the quadrature demodulator 113 are divided to two groups, and a reception signal process is performed on one of them by a receiver 116 after a dc component is removed from each of the divided I and Q signals by a corresponding one of first and second high pass filters (first and second HPFs) 114 and 115. The divided I and Q signals in the other group are A/D converted by the first and second A/D converters 303 and 304, and then becomes I and Q error signals, respectively. The I and Q error signals which are outputted by the first and second A/D converters 303 and 304 are then integrated by the first and second integrators 305 and 306, and becomes I and Q signals, respectively. The first and second D/A converters 308 and 309 perform D/A conversion on the outputs of the first and second integrators 305 and 306, respectively. These signals are inputted, as I and Q signals, to the quadrature modulator 202, respectively.

More specifically, the leakage signal which was not able to be canceled out through the combination with the cancel signal is decomposed into I and Q error signals by the quadrature demodulator 113 by using the signal which is the divided part of the transmitted signal. By integrating the I and Q error signals of the leakage signal which were not able to be canceled out and adding the integrated I and Q error signals to the I and Q signals inputted to the quadrature modulator 202 which generates the cancel signal from the same signal that is the divided part of the transmitted signal, the leakage signal is further canceled out. Furthermore, also when the amplitude and phase of the leakage signal vary and the leakage signal cannot be sufficiently canceled out, the leakage signal cancellation apparatus follows the variation in the leakage signal by doing the same operation to further cancel out the leakage signal.

For example, when the error signal of I channel which is converted into baseband I and Q signals by the quadrature demodulator 113 is positive (or negative), the amplitude data which are outputted by the first integrator 305 increase (or decrease). Then, the amplitude of the I signal which is obtained by performing D/A conversion on the integrated result (the output of the first D/A converter 308) increases (or decreases), and the amplitude of the I component of the cancel signal which the quadrature modulator 202 generates by quadrature-modulating the I and Q signals also increases (or decreases). By combining out of phase such the cancel signal by using the combiner 205, the leakage signal cancellation apparatus decreases (or increases) the amplitude of the I component of the leakage signal combined. Such the control is performed at all times in such a manner that the I and Q components of the received signal become equal to those of the cancel signal, respectively, the amplitude of the received signal becomes equal to that of the cancel signal, and the I and Q error signals become zero.

By doing in the above-mentioned way, the leakage signal cancellation apparatus controls the cancel signal which is combined with the part of the transmitted signal divided by the coupler 201 in such a manner that the cancel signal has the same amplitude as the received signal and is in phase with the received signal. Because this cancel signal is combined out of phase with the received signal by the combiner 205, the leakage signal included in the received signal is canceled out.

When the leakage signal cancellation apparatus shifts from the adaptive operation mode to the cancellation operation mode during reception, a holding signal is inputted from a control unit not shown in the figure to both the first integrator 305 and the second integrator 306. As a result, the first integrator 305 and the second integrator 306 stop their integration control operations, and their outputs are then held. The I and Q signals which are outputted by the first and second D/A converters 308 and 309 are then held at fixed values, too, and therefore the cancel signal which is generated by the quadrature modulator 202 has a fixed value. Thus, the quadrature modulator 202, the quadrature demodulator 113, and the first and second integrators 305 and 306 can prevent any interference from being exerted upon the received signal by shifting from the adaptive operation mode to the cancellation operation mode.

Figure 6:
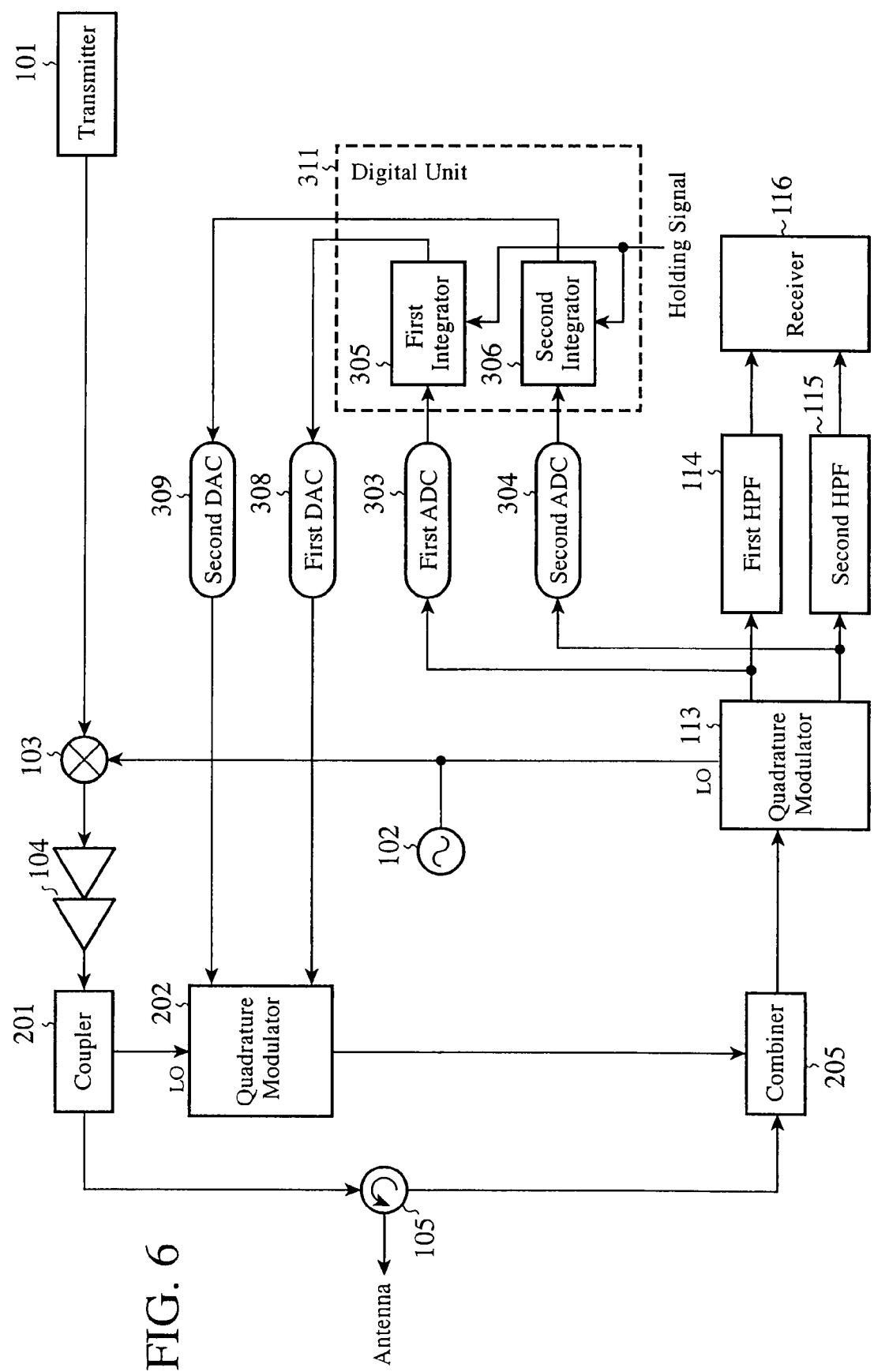
FIG. 6 is a block diagram showing a transceiver provided with the leakage signal cancellation apparatus in accordance with Embodiment 7 of the present invention.

In the example of FIG. 5, a part of the transmitted signal which is divided by the coupler 201 is used as the LO signal of the quadrature demodulator 113. As an alternative, the local oscillation signal which is outputted by the local oscillator 102 can be used as shown in FIG. 6. Furthermore, as in the case of Embodiment 2, a vector modulator can be used instead of the quadrature modulator 202.

As mentioned above, the leakage signal cancellation apparatus according to Embodiment 7, which cancels out a leakage signal which is leakage of a transmitted signal to a received signal in a transceiver, includes: a quadrature modulator for dividing a part of the transmitted signal so as to generate a cancel signal; a combiner for combining the received signal with the cancel signal outputted from the quadrature modulator so as to cancel out the leakage signal; a quadrature demodulator for converting the received signal outputted from the combiner into baseband I and Q signals so as to output I and Q error signals; and first and second integrators for integrating the I and Q error signals, respectively, and the quadrature modulator generates the cancel signal on the basis of output signals of the first and second integrators, and the quadrature modulator, the quadrature demodulator, and the first and second integrators performs feedback control in such a manner that the cancel signal has the same amplitude as the leakage signal and is in phase with the leakage signal, and have a cancellation operation mode in which the leakage signal cancellation apparatus cancels out the leakage signal, and an adaptive operation mode in which the leakage signal cancellation apparatus follows the leakage signal which varies to generate the cancel signal, and keep the amplitude and phase of the cancel signal at constant in the cancellation operation mode. Therefore, the leakage signal cancellation apparatus can prevent any interference from being exerted upon the received signal due to the feedback control operation, and can therefore enable the receiver to demodulate the received signal properly even when the level of the received signal is small.

Embodiment 8

In the above-mentioned embodiments, the output of the circuit which generates the cancel signal is always connected to the combiner 205 which combines the received signal and the cancel signal. In such the structure, when a thermal noise occurs from the quadrature modulator in the circuit which generates the cancel signal, the amplifier for level adjustment, or the like, this thermal noise enters the received signal via the combiner 205. As a result, for example, at a time of detection of an available channel, there is a possibility that the thermal noise which occurs in the leakage signal cancellation apparatus is inputted to the receiver 108 and this results in undetection of whether or not there exists a weak signal received. Therefore, a transceiver in accordance with Embodiment 7 comprises a switch for turning on or off the cancel signal, and, in a case in which the transceiver performs only a receiving operation without performing any transmitting operation, such as in a case of detection of an available channel, turns off this cancel signal switch.

Figure 7:
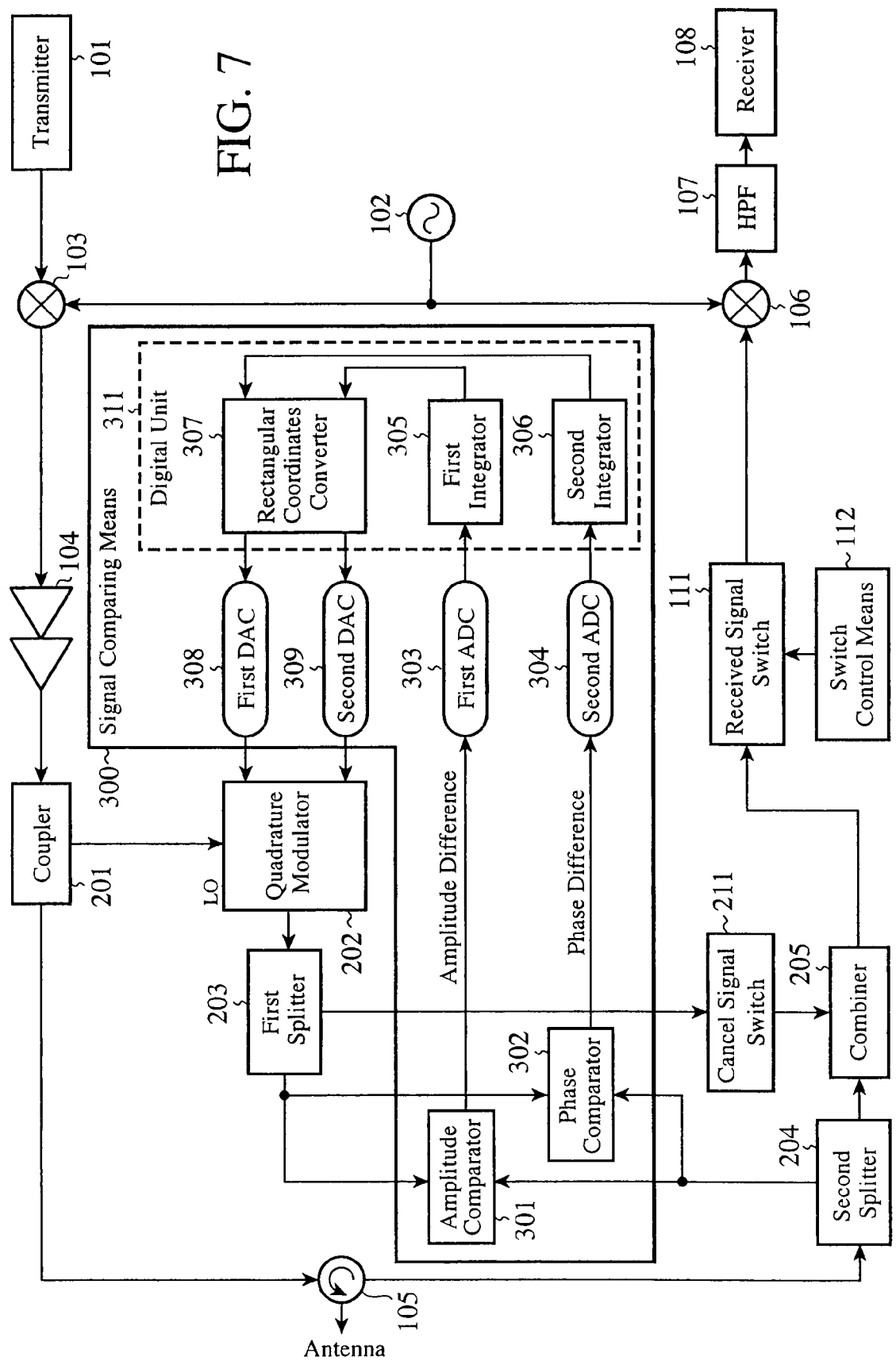
FIG. 7 is a block diagram showing a transceiver provided with a leakage signal cancellation apparatus in accordance with Embodiment 8 of the present invention.

FIG. 7 is a block diagram of the transceiver which uses a leakage signal cancellation apparatus of Embodiment 8.

In the figure, the cancel signal switch 211 is the one disposed between the first splitter 203 and the combiner 205, for making a connection or disconnection between the output of the first splitter 203 and the input of the combiner 205. This cancel signal switch 211 is controlled by a control unit not shown in the figure in such a manner that it enters an off state at a time of detection of an available channel in the transceiver.

More specifically, in an interrogator for a RFID system or a radar apparatus, in a case in which either a plurality of interrogators or the radar apparatus shares a plurality of transmit frequency channels, the interrogator or the radar apparatus checks to see whether or not a channel via which it is going to transmit a signal is available, receives the frequency of the channel to check to see the receive signal level, and checks to see whether no other interrogators or no other radar apparatuses have transmitted any signal. After then checking that other apparatuses are not using the channel, the interrogator or the radar apparatus transmits signals and prevents a plurality of apparatuses from transmitting signals via the channel having the same frequency and from having interference on one another. That is, at a time of such detection of an available channel, the interrogator performs only a receiving operation without performing any transmitting operation.

A control unit not shown in the figure carries out off-control of the cancel signal switch 211 at a time of such detection of an available channel in the transceiver to block out the input to the combiner 205. As a result, because the thermal noise which occurs in the leakage signal cancellation apparatus can be prevented from being inputted to the receiver 108, whether or not there exists a received signal can be detected even if the received signal is a weak signal.

Figure 8:
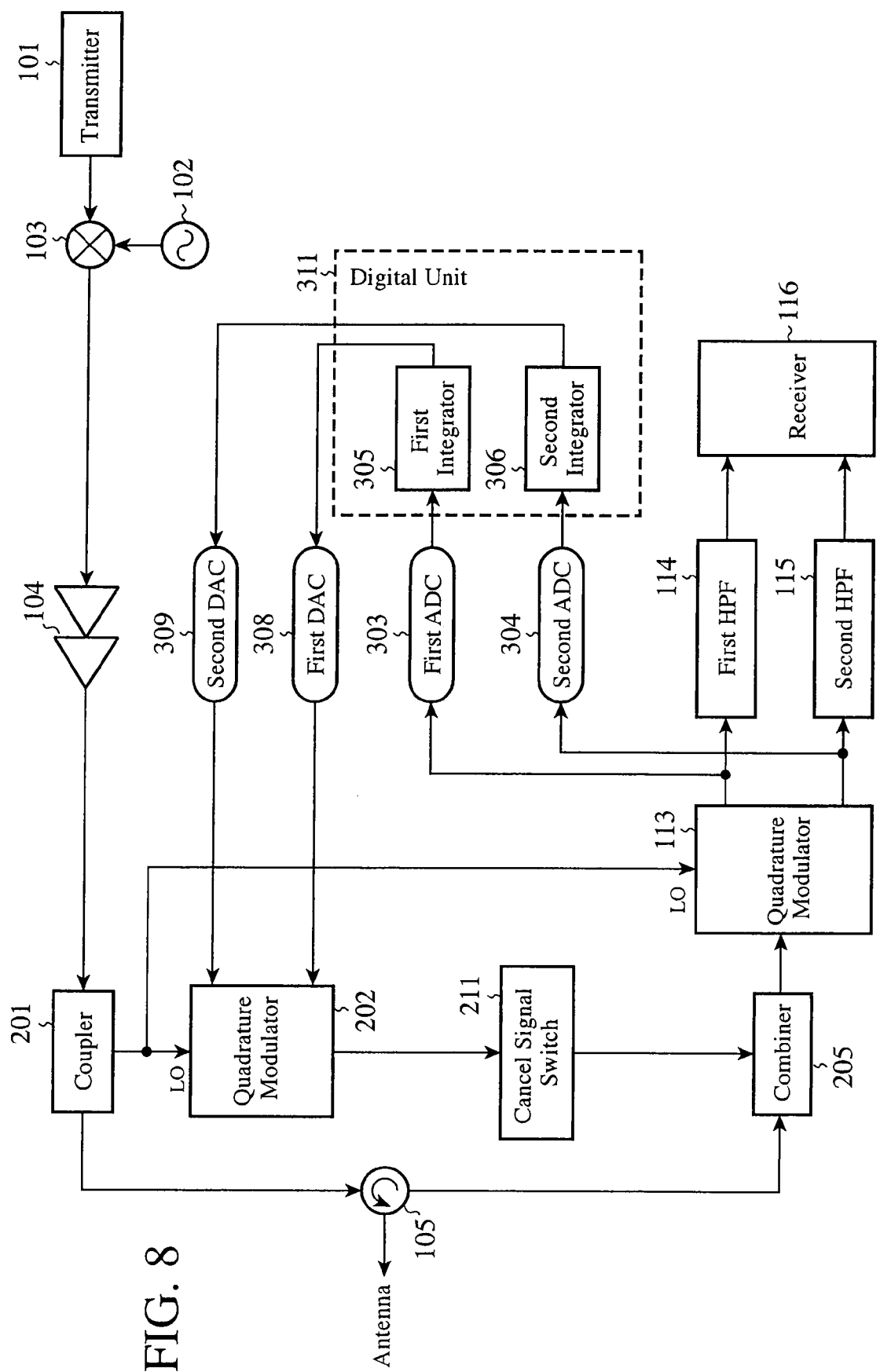
FIG. 8 is a block diagram showing a transceiver provided with the leakage signal cancellation apparatus in accordance with Embodiment 8 of the present invention.

In the above-mentioned example shown in FIG. 7, the example in which the cancel signal switch 211 is added to the structure of Embodiment 1 is shown. As an alternative, for example, this embodiment can be applied to the structure of the leakage signal cancellation circuit described in nonpatent reference 1, and other embodiments, as shown in FIG. 8. In this case, the same advantage can be provided.

As mentioned above, the leakage signal cancellation apparatus according to Embodiment 8 comprises the cancel signal switch which turns on or off the input of the cancel signal to the combiner, and turns off the cancel signal switch in the case of performing only a receiving operation without performing any transmitting operation. Therefore, even when receiving a weak signal, such as at a time of detection of an available channel, the leakage signal cancellation apparatus can detect whether the signal exists certainly.

INDUSTRIAL APPLICABILITY

As mentioned above, the leakage signal cancellation apparatus in accordance with the present invention has a structure which implements cancellation of the leakage signal with stability while following variations in the leakage signal, and is suitable for use in an interrogator of a RFID system, and for use in a radar apparatus.

The invention claimed is:

1. A leakage signal cancellation apparatus which cancels out a leakage signal which is leakage of a transmitted signal to a received signal in a transceiver, said apparatus comprising:
   a quadrature modulator or a vector modulator for dividing a part of said transmitted signal so as to generate a cancel signal;
   a signal comparing means for comparing an amplitude and a phase of the cancel signal generated by said quadrature modulator or said vector modulator with those of said received signal, and for outputting signals corresponding to results of the comparison; and a combiner for combining said received signal with an antiphase cancel signal whose phase is made to be opposite to that of the cancel signal outputted from said quadrature modulator or said vector modulator so as to cancel out said leakage signal, and wherein said quadrature modulator or said vector modulator generates said cancel signal on a basis of the output signals outputted by said signal comparing means, and said quadrature modulator or said vector modulator and said signal comparing means perform feedback control in such a manner that said cancel signal has a same amplitude as said leakage signal and is in phase with said leakage signal.

2. A leakage signal cancellation apparatus which cancels out a leakage signal which is leakage of a transmitted signal to a received signal in a transceiver, said apparatus comprising:

a quadrature modulator or a vector modulator for dividing a part of said transmitted signal so as to generate an antiphase cancel signal;

a signal comparing means for comparing an amplitude and a phase of the antiphase cancel signal generated by said quadrature modulator or said vector modulator with those of said received signal, and for outputting signals corresponding to results of the comparison; and a combiner for combining said received signal with the antiphase cancel signal outputted from said quadrature modulator or said vector modulator so as to cancel out said leakage signal, and wherein said quadrature modulator or said vector modulator generates said antiphase cancel signal on a basis of the output signals outputted by said signal comparing means, and said quadrature modulator or said vector modulator and said signal comparing means perform feedback control in such a manner that said antiphase cancel signal has a same amplitude as said leakage signal and is in opposite phase with said leakage signal.

3. A leakage signal cancellation apparatus which cancels out a leakage signal which is leakage of a transmitted signal to a received signal in a transceiver, said apparatus comprising:

a quadrature modulator or a vector modulator for generating a cancel signal on a basis of a signal from a local oscillator for generating a carrier wave for the transmitted signal;

a signal comparing means for comparing an amplitude and a phase of the cancel signal generated by said quadrature modulator or said vector modulator with those of said received signal, and for outputting signals corresponding to results of the comparison; and a combiner for combining said received signal with an antiphase cancel signal whose phase is made to be opposite to that of the cancel signal outputted from said quadrature modulator or said vector modulator so as to cancel out said leakage signal, and wherein said quadrature modulator or said vector modulator generates said cancel signal on a basis of the output signals outputted by said signal comparing means, and said quadrature modulator or said vector modulator and said signal comparing means perform feedback control in such a manner that said cancel signal has a same amplitude as said leakage signal and is in phase with said leakage signal.

4. A leakage signal cancellation apparatus which cancels out a leakage signal which is leakage of a transmitted signal to a received signal in a transceiver, said apparatus comprising:

a quadrature modulator or a vector modulator for generating an antiphase cancel signal on a basis of a signal from a local oscillator for generating a carrier wave for the transmitted signal;

a signal comparing means for comparing an amplitude and a phase of the antiphase cancel signal generated by said quadrature modulator or said vector modulator with those of said received signal, and for outputting signals corresponding to results of the comparison; and a combiner for combining said received signal with the antiphase cancel signal outputted from said quadrature modulator or said vector modulator so as to cancel out said leakage signal, and wherein said quadrature modulator or said vector modulator generates said antiphase cancel signal on a basis of the output signals outputted by said signal comparing means, and said quadrature modulator or said vector modulator and said signal comparing means perform feedback control in such a manner that said antiphase cancel signal has a same amplitude as said leakage signal and is in opposite phase with said leakage signal.

5. A leakage signal cancellation apparatus which cancels out a leakage signal which is leakage of a transmitted signal to a received signal in a transceiver, said apparatus comprising:

a first quadrature modulator or a first vector modulator for quadrature-modulating signals which are acquired by complex-multiplying signals of I and Q channels which are outputted by a transmitter by signals for adjusting their amplitudes and phases, respectively, so as to generate a cancel signal;

a second quadrature modulator or a second vector modulator for quadrature-modulating the signals of I and Q channels which are outputted by said transmitter so as to generate said transmitted signal;

a signal comparing means for comparing an amplitude and a phase of the cancel signal generated by said first quadrature modulator or said first vector modulator with those of said received signal, and for outputting signals corresponding to results of the comparison; and a combiner for combining said received signal with an antiphase cancel signal whose phase is made to be opposite to that of the cancel signal outputted from said first quadrature modulator or said first vector modulator so as to cancel out said leakage signal, and wherein said first quadrature modulator or said first vector modulator generates said antiphase cancel signal on a basis of signals which are acquired by complex-multiplying the output signals outputted by said signal comparing means by the signals of I and Q channels which are outputted by said transmitter, and said first quadrature modulator or said first vector modulator and said signal comparing means perform feedback control in such a manner that said cancel signal has a same amplitude as said leakage signal and is in phase with said leakage signal.

6. A leakage signal cancellation apparatus which cancels out a leakage signal which is leakage of a transmitted signal to a received signal in a transceiver, said apparatus comprising:

a first quadrature modulator or a first vector modulator for quadrature-modulating signals which are acquired by complex-multiplying signals of I and Q channels which are outputted by a transmitter by signals for adjusting their amplitudes and phases, respectively, so as to generate an antiphase cancel signal;

a second quadrature modulator or a second vector modulator for quadrature-modulating the signals of I and Q channels which are outputted by said transmitter so as to generate said transmitted signal;

a signal comparing means for comparing an amplitude and a phase of the antiphase cancel signal generated by said first quadrature modulator or said first vector modulator with those of said received signal, and for outputting signals corresponding to results of the comparison; and a combiner for combining said received signal with the antiphase cancel signal outputted from said first quadrature modulator or said first vector modulator so as to cancel out said leakage signal, and wherein said first quadrature modulator or said first vector modulator generates said antiphase cancel signal on a basis of signals which are acquired by complex-multiplying the output signals outputted by said signal comparing means by the signals of I channel and Q channel which are outputted by said transmitter, and said first quadrature modulator or said first vector modulator and said signal comparing means perform feedback control in such a manner that said antiphase cancel signal has a same amplitude as said leakage signal and is in opposite phase with said leakage signal.

7. The leakage signal cancellation apparatus according to claim 1, wherein said apparatus comprises a received signal switch disposed as a backward stage of the combiner, and a switch control means for carrying out on/off control of said received signal switch.

8. The leakage signal cancellation apparatus according to claim 7, wherein the switch control means turns off said received signal switch in a case in which the transmitted signal is a modulated signal having a state in which its signal level is equal to or lower than a predetermined level.

9. The leakage signal cancellation apparatus according to claim 1, wherein in a case in which the transmitted signal is a modulated signal having a state in which its signal level is equal to or lower than a predetermined level, said apparatus holds an input from the signal comparing means to the quadrature modulator or the vector modulator during transmission of the modulated signal.

10. The leakage signal cancellation apparatus according to claim 1, wherein the quadrature modulator or the vector modulator and the signal comparing means have a cancellation operation mode in which the leakage signal cancellation apparatus cancels out the leakage signal, and an adaptive operation mode in which the leakage signal cancellation apparatus follows the leakage signal which varies to generate the cancel signal, and keep the amplitude and phase of the cancel signal at constant in said cancellation operation mode.

11. The leakage signal cancellation apparatus according to claim 1, wherein said apparatus comprises a cancel signal switch for turning on or off an input of the cancel signal to the combiner, and, in a case in which the transceiver performs only a receiving operation without performing any transmitting operation, said leakage signal cancellation apparatus turns off said cancel signal switch.

12. A leakage signal cancellation apparatus which cancels out a leakage signal which is leakage of a transmitted signal to a received signal in a transceiver, said apparatus comprising:

a quadrature modulator or a vector modulator for dividing a part of said transmitted signal so as to generate a cancel signal;

a combiner for combining said received signal with the cancel signal outputted from said quadrature modulator or said vector modulator so as to cancel out said leakage signal;

a quadrature demodulator for converting the received signal outputted from said combiner into baseband I and Q signals so as to output I and Q error signals; and first and second integrators for integrating said I and Q error signals, respectively, and wherein said quadrature modulator or said vector modulator generates said cancel signal on a basis of output signals of said first and second integrators, and said quadrature modulator or said vector modulator, said quadrature demodulator, and said first and second integrators performs feedback control in such a manner that said cancel signal has a same amplitude as said leakage signal and is in phase with said leakage signal, and have a cancellation operation mode in which the leakage signal cancellation apparatus cancels out the leakage signal, and an adaptive operation mode in which the leakage signal cancellation apparatus follows the leakage signal which varies to generate the cancel signal, and keep the amplitude and phase of the cancel signal at constant in said cancellation operation mode.

13. A leakage signal cancellation apparatus which cancels out a leakage signal which is leakage of a transmitted signal to a received signal in a transceiver, said apparatus comprising:

a quadrature modulator or a vector modulator for dividing a part of said transmitted signal so as to generate a cancel signal;

a combiner for combining said received signal with the cancel signal outputted from said quadrature modulator or said vector modulator so as to cancel out said leakage signal;

a cancel signal switch for turning on or off an input of the cancel signal to said combiner;

a quadrature demodulator for quadrature-demodulating the received signal outputted from said combiner so as to output I and Q error signals; and first and second integrators for integrating said I and Q error signals, respectively, and wherein said quadrature modulator or said vector modulator generates said cancel signal on a basis of output signals of said first and second integrators, said quadrature modulator or said vector modulator, said quadrature demodulator, and said first and second integrators performs feedback control in such a manner that said cancel signal has a same amplitude as said leakage signal and is in phase with said leakage signal, and, in a case in which the transceiver performs only a receiving operation without performing any transmitting operation, said leakage signal cancellation apparatus turns off said cancel signal switch.

* * * * *